Aug. 13, 1940.　　　C. B. MOORE ET AL　　　2,211,148
MEASURING INSTRUMENT
Filed Jan. 18, 1938　　　3 Sheets-Sheet 1

INVENTOR.
COLEMAN B. MOORE
WALTER G. TRUMBOWER
BY George W. Murdaugh
ATTORNEY

Aug. 13, 1940.　　C. B. MOORE ET AL　　2,211,148
MEASURING INSTRUMENT
Filed Jan. 18, 1938　　3 Sheets-Sheet 2

INVENTOR.
COLEMAN B. MOORE
WALTER G. TRUMBOWER
BY
ATTORNEY

Aug. 13, 1940.  C. B. MOORE ET AL  2,211,148
MEASURING INSTRUMENT
Filed Jan. 18, 1938     3 Sheets-Sheet 3

INVENTOR.
COLEMAN B. MOORE
WALTER G. TRUMBOWER
BY George M. Merchant
ATTORNEY

Patented Aug. 13, 1940

2,211,148

UNITED STATES PATENT OFFICE 2,211,148

MEASURING INSTRUMENT

Coleman B. Moore, Carroll Park, and Walter G. Trumbower, Philadelphia, Pa., assignors to The Brown Instrument Company, Philadelphia, Pa., a corporation of Pennsylvania Application January 18, 1938, Serial No. 185,486

14 Claims. (Cl. 74—1)

Our present invention relates to measuring instruments, and particularly to measuring instruments of the self-balancing potentiometric type which may be used to adjust a member according to the varying values of a measurable potential difference, such as the voltage of a thermocouple responsive to a variable temperature.

The general object of our invention is to provide an instrument of the above-mentioned type, which is reliable and accurate in operation and which includes means to adjust a potentiometer slide-wire in a direction and by an amount in proportion to the deviation of a galvanometer pointer, the coil of which may be in circuit with said slide-wire and a source of voltage to be measured.

The improvements of the present invention were especially devised to provide a smooth and accurate adjustment of the potentiometer slide-wire by means of a pair of friction clutches that are mounted on a cross-member, which is set in accordance with the deviation of a galvanometer pointer. These clutches are then actuated individually depending on whether the pointer has deviated to one side or the other of a neutral position. This provides a positive means of adjusting a slide-wire any amount, within limits, in the proper direction in order to control some operation for which a potentiometer is adapted.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we illustrated and described a preferred embodiment of the invention.

Figure 1:
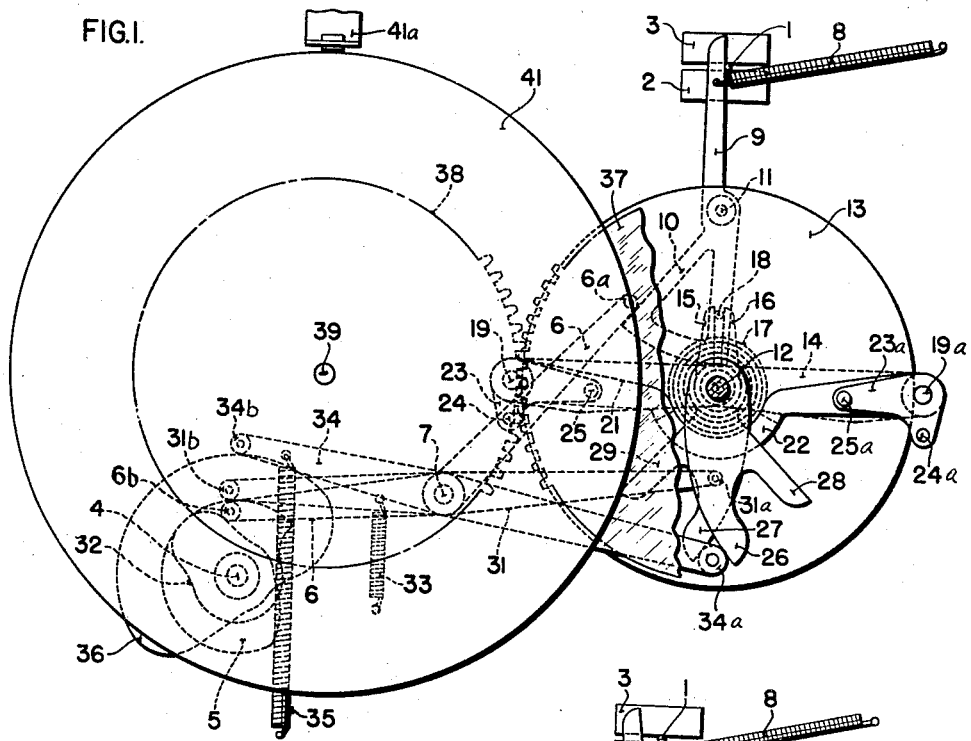
Fig. 1 is a front view of our device showing the parts in operative position.
Figure 2:
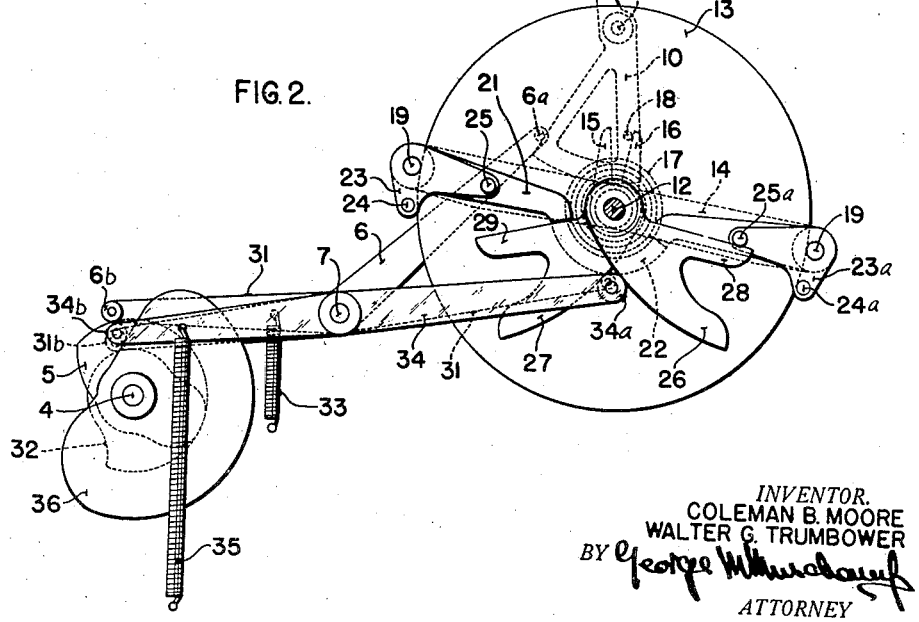
Fig. 2 is a view of the device shown in Fig. 1 with certain parts omitted and other parts in a different position.

Referring to the drawings, in Figs. 1 and 2 there is shown a galvanometer pointer 1 clamped between a stationary member 2 and a movable member 3 that is raised and lowered periodically in any desired manner in timed relation to the movement of the other parts of the device. The galvanometer pointer 1 is part of a galvanometer (not shown) which may be connected in a potentiometer circuit with a thermocouple or some other source of variable voltage to be measured.

Potentiometric circuits of the type contemplated herein are well known, such for example as disclosed in the Harrison Patent 1,898,124, and include a known source of voltage impressed across a resistor, commonly termed the instrument slide-wire, the galvanometer and source of variable voltage being connected in series to oppose the known voltage across a variable portion of said resistor. When the variable voltage, for a given adjustment of the slide-wire, is equal and opposite to the known voltage, the galvanometer is in its null position but on an increase above or decrease below the known voltage of the unknown voltage, the galvanometer will be deflected in one direction or the other respectively proportionately to the magnitude of the increase or decrease. This invention is concerned with the means by which deflections of said galvanometer control slide-wire adjustments to continuously rebalance the potentiometer system.

The slide-wire may be mounted on the edge of a rotatable disc 41 and adapted to cooperate with a stationary contact 41a, and the means by which the disc 41 is rotated under control of pointer 1 includes a feeler 9 pivoted at 11 and urged into engagement with the pointer by a spring 8 but periodically moved out of engagement with the pointer by means of a lever 6 pivoted at 7, the roller 6a of which engages the lower end 10 of the feeler 9 and is oscillated by means of a continuously rotating cam 5. Cam 5 is fixed to shaft 4 which is rotated by a motor, not shown. When depressor bar 3 has clamped the pointer, as shown, cam 5 permits lever 6 to turn counter-clockwise and thus allows spring 8 to move feeler 9 clockwise until it contacts the pointer as shown in Fig. 1.

The position of feeler 9 when it contacts the pointer 1 determines the rotative effect on a disc 13 of a pair of periodically operating clutch-members. Disc 13 is fixed to shaft 12 together with a gear 37, the latter of which is in mesh with a gear 38 fixed to a shaft 39 to which the slide-wire disc 41 is also fixed. A cross-piece 14, pivoted on the shaft 12, extends behind the disc 13 and is provided with a finger 15 extending from its upper surface. Also pivoted on shaft 12 is another finger 16 which is biased toward finger 15 by a spring 17 which has one end fastened to finger 16 and the other end fastened to member 14. The fingers 15 and 16 receive between them a pin 18 projecting from the feeler 9 and along with the pin 18 they serve as a connection between the feeler 9 and the cross-piece 14, so that movement of the former under the influence of spring 8 will move the latter around shaft 12 a corresponding amount.

Movement of the cross-piece 14 from an initial position to that corresponding to the position of feeler 9 when it is contacting pointer 1 is free, but the return movement thereof to a neutral position is utilized to rotate disc 13 and the slide-wire 41 by means of the clutches and gearing above mentioned. On each end of the cross-piece 14 and projecting forwardly therefrom are pins 19 and 19a that support clutch members to rotate the disc 13. Pin 19 has pivoted on its front end a lever 21 that has at its end a curved portion, the lower edge of which is concentric with shaft 12. In a like manner a lever 22 is pivoted to the front of pin 19a and has at its inner end a curved portion similar to that of lever 21. Clutch members 23 and 23a are attached respectively to levers 21 and 22 and each consists of a bell-cranked member having a clutch pin 24 or 24a adapted to engage the edge of disc 13 and an actuating pin 25 or 25a. The means for moving the pins 24 and 24a into clutching engagement with the periphery of disc 13 consists of a roller 31a on the end of lever 31 pivoted at 7 and biased in a counter-clockwise direction by spring 33. This lever 31 is periodically moved around its pivot by the engagement between a roller 31b on its left end and a cam 32 on shaft 4. After the cross-bar 14 has been positioned in accordance with the position of pointer 1 and the clutches have engaged the periphery of disc 13, the cross-bar and clutches are moved to a horizontal position to rotate the disc 13 and slide-wire 41. This is accomplished by engagement between the arms 28 and 29 of a pair of actuating members 26 and 27. Movement of members 26 and 27 is carried out by engagement between the curved surfaces on these members and a roller 34a on a lever 34 that is urged in a counter-clockwise direction around shaft 7 by spring 35. The lever 34 is periodically oscillated around shaft 7 to permit members 26 and 27 to assume their inactive positions by means of engagement of a roller 34b thereon and a cam 36 on the continuously rotating shaft 4.

The position of the cross-bars 14 and 21 in Fig. 1 is that to which they are moved by feeler 9 when the pointer is in its mid-position. The cross-bars in Fig. 2 are shown slightly tilted as they would be moved if the pointer was positioned to the left of its mid-position.

The operation of this modification is as follows: the shaft 4 rotating in a counter-clockwise direction moves the cam 5 so that its low portion comes under roller 6b, thus allowing the spring 8 to move feeler 9 to the right into engagement with the pointer 1, which is now clamped in position by parts 2 and 3. As the feeler 9 moves, the pin 18 in its lower end engages arm 15 and tilts the cross-bar 14 and levers 21 and 22 with their associated clutches 23 in a counter-clockwise direction to a position corresponding to that of pointer 1. Just as the lowest portion of cam 5 is under roller 6b the low portion of cam 32 comes under roller 31b thus permitting spring 33 to force roller 31a on lever 31 into engagement with the arcuate portions of levers 21 and 22 to move the clutches into engagement with disc 13. Continued rotation of shaft 4 brings the high portion of cam 5 under roller 6b to move feeler 9 out of engagement with the pointer so that the pointer can be free to assume a new position while the remainder of the cycle is completed. The arm 16 gives under the tension of spring 17 as shown in Fig. 2 so that this may be accomplished.

Just as the high part of cam 32 comes under roller 31b the low portion of cam 36 is coming under roller 34b so that lever 34, under the influence of spring 35, forces roller 34a up between the curved surfaces of members 26 and 27. As the roller 34a moves upwardly the arms 28 and 29 of members 26 and 27 are moved into engagement with pin 25 or 25a. If the cross-bar is horizontal as in Fig. 1, the pins 25 and 25a will be contacted simultaneously and there will be no movement of the cross-bars and the disc 13. If, however, the cross-bars are tilted as shown in Fig. 2, arm 28 will engage pin 25a to rotate the disc 13 in a counter-clockwise direction. This rotation will continue until arm 29 engages pin 25 and thus stops the movement of the disc, the cross-bar now being horizontal.

If the pointer has been moved to the right of its mid-position the pin 25 would have been engaged first and the movement of disc 13 would have been in the opposite direction. As the disc 13 rotates it rotates shaft 12 and gear 37 which in turn meshes with and rotates gear 38 attached to the slide-wire 41. It will therefore be seen that the slide-wire is rotated in a direction and an amount proportional to the deviation of the galvanometer pointer 1.

As the roller 34a and roller 31a move downwardly, due to the high portions of cams 36 and 32 coming under rollers 34b and 31b, the force tending to hold the cross-bar in position is removed. The cross-bar is now free to move under the bias of spring 17 and arm 16 bearing on pin 18, to a position that corresponds to the inactive position of pointer 9 in readiness for another cycle. This means that arms 15 and 16 will be in engagement with pin 18 and that the cross-bar 14 and levers 21 and 22 will be tilted in the direction shown in Fig. 2, but to a slightly greater extent.

Figure 3:
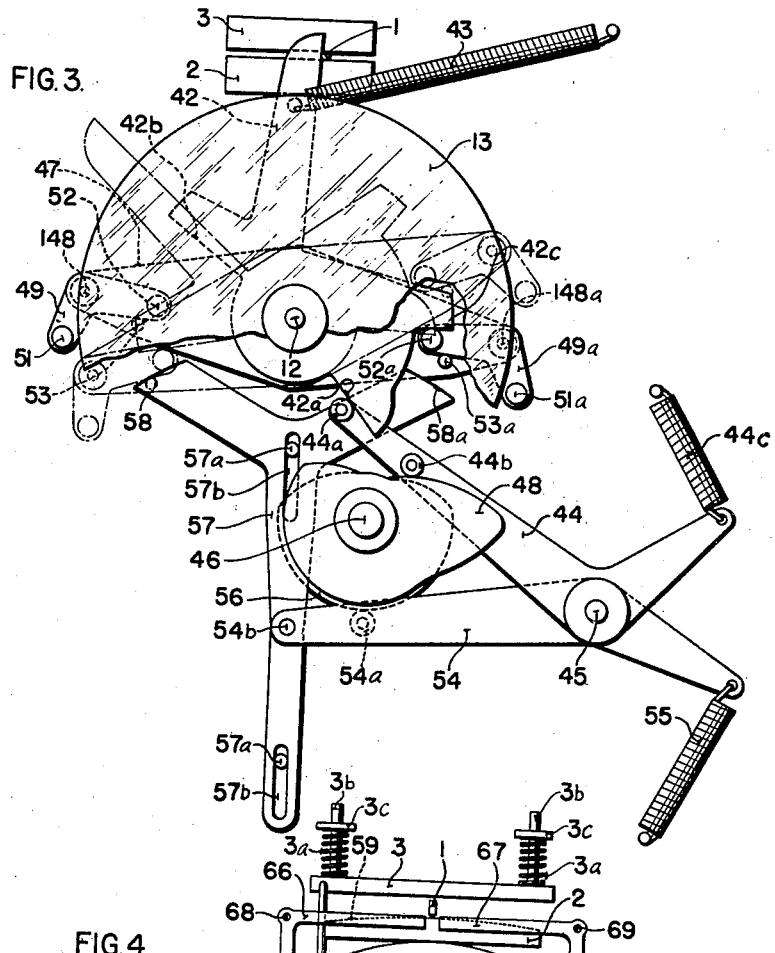
Fig. 3 is a front view of another modification of our invention.

Referring now to the modification of Fig. 3 it will be seen that the galvanometer pointer 1 is clamped between members 2 and 3 as it was in Fig. 1. The shaft 12 supports a disc 13 which is rotated by clutches similar to those of Fig. 1 to rotate a slide-wire through gearing that is not shown in this figure. The modification of this figure differs from that of Fig. 1 in the manner in which the cross-bar is positioned and the manner in which the clutches are actuated.

A feeler 42 for contacting the galvanometer pointer 1 is rotatably mounted on shaft 12 and is so shaped that it is provided with three edges 42a, 42b and 42c. This feeler is moved toward contact with the pointer 1 by spring 43 and is moved away from said contact by the engagement of edge 42a with a roller 44a on one end of a lever 44. This lever is urged in a counter-clockwise direction around shaft 45 by spring 44c and is moved clockwise, to move feeler 42, by the engagement of a roller 44b thereon with a constantly rotating cam 46.

A pair of clutch members 49 and 49a are pivotally mounted at 148 and 148a respectively on cross-piece 47 which is in turn freely rotatable on shaft 12. Each of these clutch members has a clutch pin 51 or 51a and an actuating pin 52 or 52a, and each has a gravitational bias into engagement with a pin 53 or 53a on the cross-bar 47. The clutch pins 51 and 51a are moved into clutching engagement with the disc 13 by a Y-shaped member 57 which is guided for vertical movement by pins 57a extending through slots 57b in the member 57. The member 57 is moved upwardly into clutch engaging position by a lever 54 that is biased clockwise around shaft 45 by a spring 55 and is pivoted to member 57 at 54b. The member 57 is moved downwardly by engagement between roller 54a on lever 54, and a constantly rotating cam 56 on shaft 46. The ends of the upper forked part of member 57 are formed with edges 58 and 58a respectively, which are adapted, when member 57 is raised, to engage pins 52 or 52a to actuate the clutches and rotate disc 13.

In the operation of this modification, feeler 42 and cross-bar 47 are moved under the action of cam 48 and lever 44 into the dotted position of Fig. 3, the edge 42b contacting pin 52. On a subsequent clockwise movement of feeler 42 under the action of spring 43, cross-bar 47 will remain temporarily stationary until pin 52a is engaged by the edge 42c, at which time the feeler 42 will be in a position in which it will engage the pointer 1 if the latter is then deflected to its maximum position to the left in Fig. 3. If at this time the pointer 1 is in any position to the right of that extreme position, cross-bar 47 will be turned clockwise until the movement of feeler 42 is intercepted by the pointer 1, thereby determining the final position of cross-bar 47. If the pointer 1 is disposed in its mid or null position, bar 47 will be moved to a horizontal position and the subsequent vertical movement of the member 57 will not result in movement of the disc 13. If the pointer 1 is deflected to the left or to the right of its mid-position, as shown in Fig. 3, bar 47 will be tilted in the counter-clockwise or clockwise direction respectively, from its horizontal position, and upon subsequent rising movement of member 57 the edges 58 or 58a may engage and move pins 52 or 52a depending upon the inclination of cross-piece 47. When either of the pins 52 or 52a is engaged it will cause its clutch member to move around pivot 48 to force clutch pin 51 or 51a into engagement with the periphery of disc 13, and thereafter rotate the disc. This rotation continues until the other edge 58 or 58a engages its respective pin, at which time the cross-piece is horizontal and movement of the disc 13 and the slide-wire that is geared to it, as is shown in Fig. 1, is discontinued.

Continued rotation of shaft 46 brings the high portion of cam 56 over roller 54a to lower member 57 and brings the highest portion of cam 48 under roller 44b thereby causing the lever 44 to move feeler 42 counter-clockwise to its extreme left-hand position until edge 42b engages pin 52 and moves it below the horizontal in preparation for another cycle.

Figure 4:
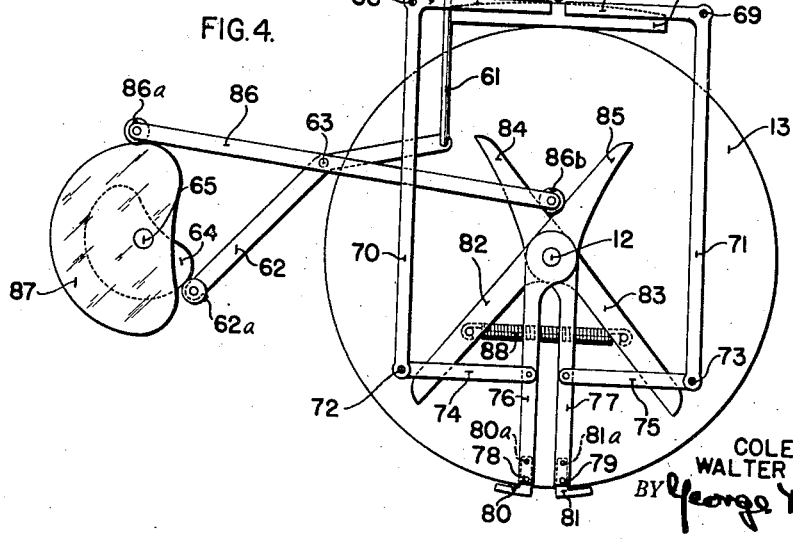
Fig. 4 is a front view of our invention using two feelers instead of one.

In the modification of Fig. 4 there are disclosed two feelers, one for each of the clutch members that moves the disc 13 and there is also shown a means for actuating the clamping bar 3 that may be used in the previously described modifications. The clamping bar 3 in this modification is shown as being normally urged downwardly by compression springs 3a that bear with their lower ends against the upper surface of bar 3 and at their upper ends against members 3c which are fastened to the framework of the instrument. The springs are kept in place and the bar 3 is guided in its vertical movement by rods 3b which are attached to bar 3 and pass through openings in the members 3c. The clamping bar is moved to its upper, non-clamping position by link 61 that is pivoted at its lower end to a lever 62 which is periodically moved in a counter-clockwise direction around pivot 63 by engagement between a roller 62a on its lower end and a constantly rotating cam 64.

Upon downward movement of clamping bar 3 the pointer 1 is moved against the upper surface of bar 2, which in this modification of the invention is formed as a curved surface 59. If the pointer 1 is in its mid-position no clutch setting action will occur, but if the pointer has deflected to either side of neutral, one of the arms 66 or 67 of bell-cranks 70 or 71, pivoted respectively at 68 and 69, will be moved outwardly from shaft 12 upon which the disc 13 is mounted. The lower end of bell-crank 70 is pivoted at 72 to a link 74 which is in turn connected to an arm 76 that is loosely pivoted on shaft 12. Pivoted at 78 to the lower end of this arm is a clutch member 80 that has a portion extending rearwardly beyond the edge of disc 13. In a like manner the lower end of bell-crank 71 has pivoted to it at 73 a link 75 which is connected at its other end to arm 77 that is also loosely mounted on shaft 12. Pivoted on the lower end of arm 77 at 79 is a clutch member 81 which has a portion extending rearwardly under the edge of disc 13.

The means for actuating the clutches 80 and 81 consist of two levers 82 and 83 that are loosely mounted on shaft 12 and have their lower ends urged toward each other by spring 88. As the lower ends of the levers 82 and 83 come together they engage respectively, pins 80a and 81a that extend rearwardly from clutch members 80 and 81 to pivot the clutch members around points 78 and 79 into engagement with the periphery of disc 13. The levers 82 and 83 are normally held apart as shown in Fig. 4 by engagement between their cam shaped upper ends 84 and 85 and roller 86b on lever 86. This lever 86 is pivoted at 63 and has roller 86a at its other end urged into contact with constantly rotating cam 87 by the action of spring 88 on the lower ends of levers 82 and 83.

In the operation of this device cam 64 is rotated clockwise with shaft 65 so that it will permit the depressor bar 3 to move down against the pointer 1. The pointer, if it is not in its mid-position, will then strike either arm 66 or 67 depending on its deflection and will move arm 66 or 67 downwardly an amount varying with this deflection depending on the position of pointer 1 and the curvature of the upper surface 59 of member 2. If the pointer has been deflected to the left, for example, member 66 will be forced downwardly so that the bell-crank 66, 70 will be moved in a clockwise direction around 68 to pull the clutch supporting member 76 to the left. Cam 64 will then raise the depressor bar 3 against the springs 3a to free the pointer, and the clutch members will stay in their adjusted positions due to some slight amount of friction, or an additional brake if necessary. When the depressor bar has moved upwardly, the low part of cam 87 starts under the roller 86a to let lever 86 move in a counter-clockwise direction. This movement is caused by spring 88 pulling the lower ends of the restoring bars 82, 83 together. As these restoring bars move inwardly, the lower end of bar 82 will hit pin 80a and cause the clutch shoe 80 to pivot around 78 so that the clutch will grip the surface of disc 13. Continued movement of 82 will then, through the clutch, move disc 13 an amount counter-clockwise depending on the deflection of the galvanometer needle. If the pointer 1 had been on the other side of its neutral position when bar 3 moved downwardly, lever 67 would have been depressed and, through the above-described operation, disc 13 would have been moved in an opposite or clockwise direction. In this modification, the disc 13 corresponds with the disc 13 in Fig. 1, and through suitable gears, not here shown, a potentiometer slide-wire similar to 41 can be moved an amount and in a direction depending upon the deflection of a galvanometer needle.

There has been shown in this modification a means for raising and lowering the depressor bar 3 that can be used in the modifications of Fig. 1 and Fig. 3, although such a means was not shown in those modifications, for the sake of clearness.

Figure 5:
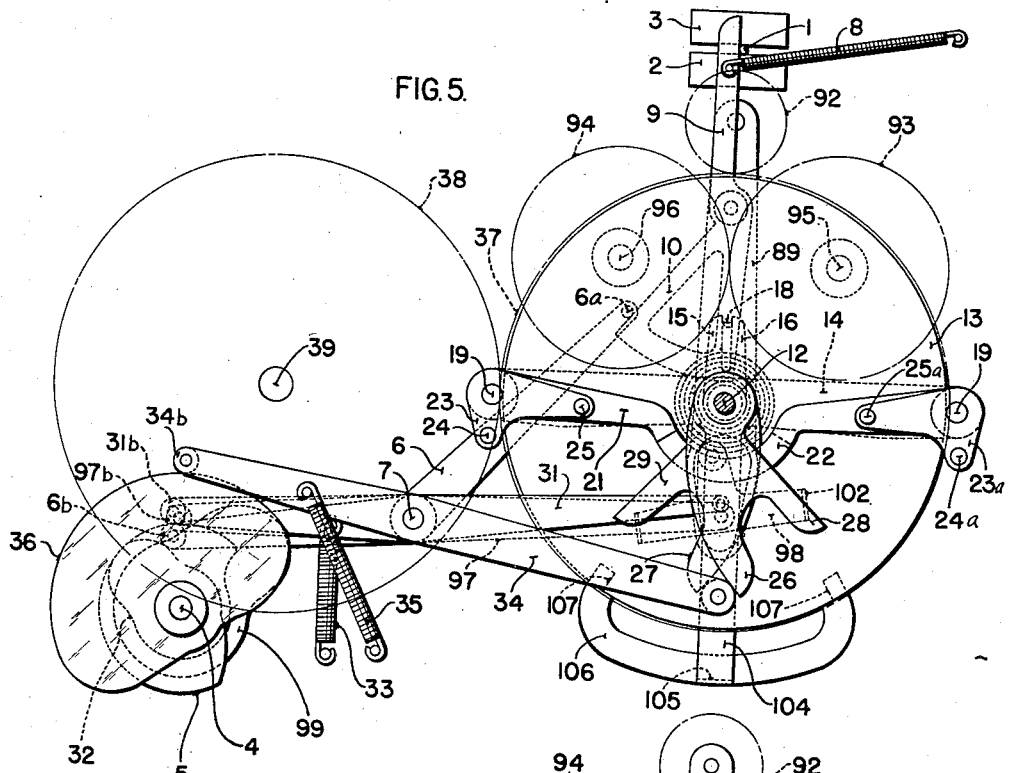
Fig. 5 is a front view of another modification.
Figure 6:
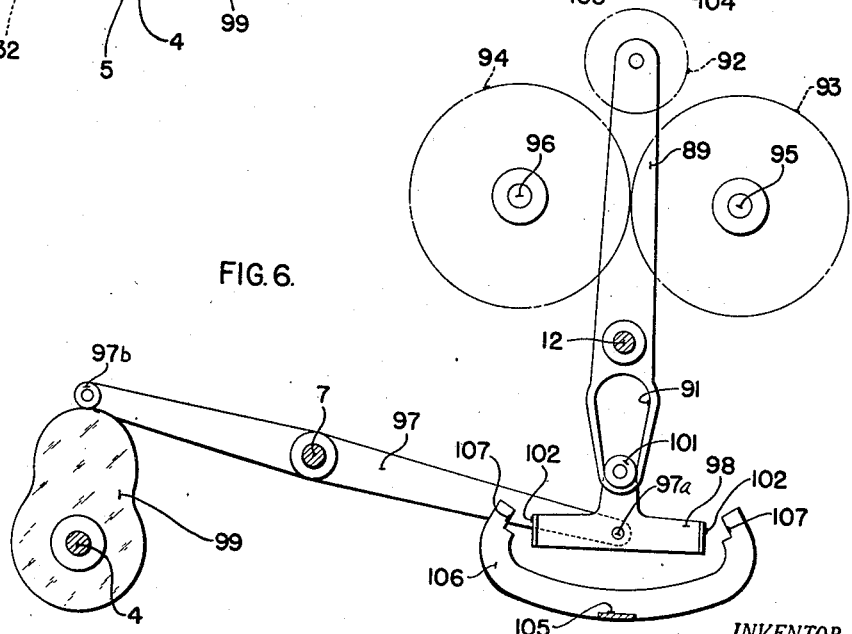
Fig. 6 is a view of the device of Fig. 5 with certain parts removed for the sake of clearness.

The modification shown in Figs. 5 and 6 is identical in most respects to that of Figs. 1 and 2. This modification has in addition to that of Fig. 1 a means for giving a continuous adjusting movement to the slide-wire for large galvanometer deflections which means consists of gearing for driving the slide-wire in the event of a large galvanometer deflection in addition to the clutch described in connection with Fig. 1.

Inasmuch as the modification of Fig. 1 has been described in detail above only those additional parts that give the continuous drive to the disc 13 and slide-wire 41 will now be described. Pivotally mounted on the shaft 12 is a lever 89 that has below its axis a generally triangularly shaped opening 91, while on the end of the part extending above the axis is a wide faced pinion 92 which is at all times in mesh with gear 37. This lever 89 is so mounted on shaft 12, by friction or other suitable means, that it will stay in any position to which it is positively adjusted. Below and to each side of pinion 92 are two constantly rotating drive gears 93 and 94 that are in mesh with each other and therefore rotating in opposite directions. These gears may be driven by the same motor (not shown) that drives cam shaft 4. Upon a large movement of the galvanometer pointer, the lever 89 is adapted to be tilted to one side or the other of the vertical to bring pinion 92 also into mesh with one of the rotating gears 93 or 94 and thereby rotate the gear 37 and slide-wire 41 continuously. The means of tilting lever 89 consists of a member 98 pivoted at 97a on lever 97 that has a gravitational and/or spring bias in a counter-clockwise direction and is moved in a clockwise direction by engagement between a roller 97b thereon and a constantly rotating cam 99 mounted on shaft 4. The member 98 has above its pivot a roller 101 extending into the opening 91 in lever 89, and has on each end an inturned edge 102, each of which is adapted to contact one of the edges 107 of a U-shaped member 106. This member 106 is attached to and moves with cross-bar 14 by a vertical arm 104 extending downwardly therefrom to below the edge of disc 13 where it is bent backwardly at 105. The parts 104, 105 and 106 may be formed of a single piece of sheet metal and attached to the cross-bar 14.

In the operation of this device, just after cam 5 has let feeler 9 move into contact with galvanometer pointer 1, as above described, the high portion of cam 99 comes under roller 97b to move member 98 downwardly to the position of Fig. 6. If the pointer 1 is in the mid-position as shown, or is only slightly away from it, the edges 102 will not contact with edges 107 of member 106, and the operation will be the same as that above described in connection with Fig. 1. If, however, there is a large galvanometer deflection, the cross-piece 14 with its attached arm 104 and member 106 will be moved enough to one side or the other so that on the down stroke of member 98 one of the edges 102 will strike a corresponding edge 107 to tilt the member 98 around its axis 97a. When member 98 is tilted, the roller 101 acting in opening 91 will tilt lever 89 and bring pinion 92 into engagement with one of the constantly rotating gears 93 or 94. Due to the mounting of lever 89, the pinion 92 will then remain in engagement with the gear that is driving it, to continuously rotate the slide-wire 41 to rebalance the potentiometer circuit. To complete the cycle cam 36 will move lever 34 until members 26 and 27 level out cross-piece 14. The lever 89 will, however, remain in its tilted position with the slide-wire being rotated by one of the gears 93 or 94. On a subsequent cycle of operation if the potentiometer circuit has been rebalanced, or nearly so, the pointer 1 will be near its mid-position, and thus cross-bar 14 and its attached member 104 carrying edges 107 will be positioned very near to their mid-positions. Because of this, edges 102 will not engage edges 107 when they are next lowered. Thereafter, when cam 99 moves lever 97 clockwise member 98 will not be tilted and the roller 101 will therefore engage the lower end of opening 91 and pull lever 89 back to a vertical position, thus disengaging pinion 92 and the gear 93 or 94 that was driving it. If the pointer 1 was still slightly away from its mid-position, the members 26 and 27 would, through clutches 24 or 24a, rotate the slide-wire 41 enough to completely rebalance the potentiometer circuit.

It should be noted at this point that the gears 93 and 94 rotate gear 37 and with it disc 13 at a slower rate than that at which the clutches 23 or 23a would normally rotate the disc. This is to prevent a binding action from occurring after the clutches have reached the end of their stroke and before they are released. As the clutches are moved into engagement with the periphery of disc 13 by lever 34 acting under the force of spring 33, they will grip the edge of the disc and be prevented by the gearing 93 or 94, 92 and 37 from moving as fast as is normal when actuating members 26 and 27 are moved upwardly by roller 34a to level out the cross-bar and clutches. Therefore, the high portion of cam 36 will move lever 34 downwardly and lever 31 will release the clutches before disc 13 can run ahead of them and cause a binding action to occur. The continuous drive, even though it is slower than the normal movement of the disc by the clutches, continues for such a period of time that the slide-wire is rotated sufficiently to correct the slide-wire setting for a large deflection of the galvanometer.

It will be seen in this modification that for small deflections of the galvanometer the slide-wire will be driven in steps by the clutches 23 and 23a while for large deflections the slide-wire will be driven continuously for a time corresponding to the amount of the deflection.

The above descriptions of our invention discloses a device in which the slide-wire of a potentiometer is accurately and positively moved an amount and in a direction corresponding to the deflection of a galvanometer. The use of the two small clutches to act on a disc geared to the slide-wire shaft is conducive to a long life of accuracy, since any wear on the parts will be approximately equal for both directions of movement.

While in accordance with the provisions of the statutes, we have illustrated and described the best form of our invention now known to use, it will be apparent to those skilled in the art that changes may be made in the form of the apparatus disclosed without departing from the spirit of our invention as set forth in the appended claims, and that certain features of our invention may sometimes be used to advantage without a corresponding use of other features.

Having now described our invention, what we claim as new and desire to secure by Letters Patent, is:

1. In a measuring instrument, a pair of relatively movable elements, gearing connected for relatively moving the said elements, a shaft, a disc mounted on said shaft and connected to the gearing, a cross-bar pivoted on said shaft, a clutch member for said disc on each end of the cross-bar, means for tilting the cross-bar from a predetermined position, and a member adapted to move one of said clutches into engagement with said disc and to restore said cross-bar to said position to thereby rotate said disc.

2. In a measuring instrument, a rotatable disc, a pair of pivoted clutches to act on said disc, positive means adapted to engage either of said clutches with said disc selectively in accordance with the positions of said clutches and move the engaged clutch to rotate said disc, and means for positioning said clutches variable amounts from a predetermined position.

3. In a measuring instrument, a rotatable disc, a member pivoted on the axis of the disc, a pivoted one-way clutch on each end of said member, means for moving said member to various positions, means acting on one of said clutches for pivoting said clutch to grip said disc and thereafter move the member back to a predetermined position, said clutch rotating the disc with said member.

4. In a measuring instrument, a pointer deflectable according to a measurable condition, a pivoted cross-member, a feeler for contacting the pointer, means connecting the cross-member and feeler to move the cross-member to a position corresponding to that of the pointer, means for holding the cross-member in position, a clutch on each end of the cross-member, a rotatable disc having its axis at the pivot point of the cross-member, means for engaging one clutch to grip the disc and thereafter move the cross-member and clutch to a predetermined position, said clutch rotating said disc with the member.

5. In a measuring instrument, a rotatable disc, a horizontally disposed, tiltable member, a clutch on each end of said member adapted to act on said disc, means for tilting said member, and means for moving the clutch below the horizontal into engagement with said disc and thereafter move said member and clutch back to horizontal position, said moving means causing the clutch to move the disc as the clutch moves.

6. In a measuring instrument, a pointer deflectable in accordance with a measurable condition on either side of neutral, a rotatable disc, a member extending across the face of said disc and pivoted about its axis, a clutch on each end of said member, a feeler, means for moving said member by said feeler to a position corresponding to the position of said pointer, means for engaging one of said clutches, depending upon the position of said member, to grip said disc and thereafter move said member and clutch to a predetermined position, said clutch moving the disc as it moves.

7. In a measuring instrument, a pivoted cross-member, a pivoted clutch member on each end thereof, a rotatable disc, means to move said cross-member from an initial position, means to contact one clutch member and move it around its pivot into engagement with said disc and thereafter move said clutch and disc until said member is in a predetermined position.

8. In a measuring instrument, a pivoted cross-member having an arm extending therefrom, means to move said cross-member and arm to various positions, a lever pivoted coaxially with said cross-member and having a pinion mounted on one end, means cooperating with said arm to move said lever to a position corresponding to that of said member and thereby move said pinion, a movable member, means connecting said movable member with said pinion and means to drive said pinion.

9. In a measuring instrument, a tiltable member, means for tilting said member about a pivot, a pivoted clutch member on each end of said member, a disc rotatable about said pivot and adapted to be engaged by said clutch members upon pivoting thereof, a pair of actuating members movable about said pivot, means for moving said actuating members until one of them contacts one clutch to pivot it and thereafter moving them until the other contacts the other clutch, said first contacted clutch engaging said disc and rotating it as the actuating member moves.

10. In a measuring instrument, a cross-member, means for moving said cross-member to various positions, a pivoted clutch on each end of said cross-member, a pair of actuating members for the clutches, means for moving said actuating members until one contacts its corresponding clutch to thereby move said cross-member to a horizontal position, a rotatable disc and means on said clutches to rotate said disc when an actuating member engages a clutch.

11. In a measuring instrument, a pivoted member, a clutch on each end of said member, means for tilting said member, a restoring member having arms adapted to engage said clutches, means for moving said restoring member until it engages the lowest clutch and thereby moves said pivoted member to a horizontal position, a rotatable disc, means on each clutch member to rotate said disc upon engagement of said clutch members, a rotatable member and means for rotating said member from said disc.

12. In a measuring instrument, a pointer deflectable on either side of neutral in accordance with a measurable condition, a rotatable disc, a cross-member having a pivoted clutch on each end movable around the axis of the disc, a feeler adapted to position said cross-member, means to move said feeler into contact with said pointer to thereby correspondingly position said cross-member, an actuating member for each clutch, means to move said actuating members until one strikes its clutch to thereby pivot the clutch into contact with said disc to rotate the disc, said rotation continuing until the other actuating member pivots its clutch into contact with the disc to stop the rotation.

13. In a measuring instrument, a rotatable disc, a cross-member having a pivoted clutch on each end adapted to engage said disc, said cross-member being pivoted for movement around the axis of said disc, means to move said cross-member to various positions, a Y-shaped restoring lever, each arm of the Y being adapted to act on a clutch, means to move said restoring member until one arm contacts a clutch and pivots it into engagement with said disc, said moving means thereafter rotating the disc until the other arm contacts and pivots the other clutch into engagement with the disc.

14. In a measuring instrument, a pivoted member having an extension thereon, means to move said member to various positions, a pivoted lever having a pinion mounted on one end thereof, cooperating means between said lever and said extension to move said lever and said pinion in a direction depending upon the position of the extension on said member, and driving means for said pinion engaged as the pinion is moved.

COLEMAN B. MOORE.
WALTER G. TRUMBOWER.